(12) United States Patent
Nakano

(10) Patent No.: US 6,931,588 B1
(45) Date of Patent: Aug. 16, 2005

(54) METHOD, MEDIUM, DISPLAY DEVICE, AND HYPERTEXT DISPLAY SYSTEM INCLUDING CORRESPONDENCE INFORMATION BETWEEN LOCATION INFORMATION AND LINK INFORMATION

(75) Inventor: Ichiro Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/288,294

(22) Filed: Apr. 8, 1999

(30) Foreign Application Priority Data

| Jul. 28, 1998 | (JP) | ............................................ 10-213339 |
| Jan. 8, 1999 | (JP) | ............................................ 11-003281 |

(51) Int. Cl.⁷ .............................................. G06F 17/21
(52) U.S. Cl. .................................................. 715/501.1
(58) Field of Search ........................ 707/10, 500, 501.1; 712/227; 704/251; 715/501.1, 500; 709/234, 105

(56) References Cited

U.S. PATENT DOCUMENTS

| 5,781,909 A | * | 7/1998 | Logan et al. ................ 707/200 |
| 5,802,292 A | * | 9/1998 | Mogul ......................... 709/203 |
| 5,890,173 A | * | 3/1999 | Yoda .......................... 358/1.15 |
| 5,913,033 A | * | 6/1999 | Grout .......................... 709/219 |
| 5,918,222 A | * | 6/1999 | Fukui et al. ................. 704/251 |
| 5,935,207 A | * | 8/1999 | Logue et al. ................ 709/219 |
| 6,023,759 A | * | 2/2000 | Omtzigt ....................... 712/227 |
| 6,038,601 A | * | 3/2000 | Lambert et al. ............. 709/226 |
| 6,092,091 A | * | 7/2000 | Sumita et al. ................. 707/10 |
| 6,154,742 A | * | 11/2000 | Herriot ......................... 707/10 |
| 6,178,434 B1 | * | 1/2001 | Saitoh ......................... 707/500 |
| 6,272,500 B1 | * | 8/2001 | Sugita .......................... 707/10 |
| 6,381,637 B1 | * | 4/2002 | Kamada ...................... 709/218 |

FOREIGN PATENT DOCUMENTS

| EP | 0 834 818 A2 | 4/1998 |
| EP | 0 945 811 B1 | 1/2003 |
| WO | WO 97/44747 | 11/1997 |
| WO | WO98/180888 | 4/1998 |
| WO | WO 98/30947 | 7/1998 |

OTHER PUBLICATIONS

Wang et al., "Prefetching in World Wide Web", Global Telecommunications Conference, 1996, pp. 28–32.

Jiang et al., "Prefetching Links on the WWW", IEEE, 1997, pp. 483–489.

Liljeberg et al. "Optimizing World–Wide Web for Weakly Connected Mobile Workstations: An Indirect Approach", IEEE 1995, pp. 132–139.

(Continued)

Primary Examiner—Heather R. Herndon
Assistant Examiner—Doug Hutton
(74) Attorney, Agent, or Firm—Staas & Halsey LLP

(57) ABSTRACT

A hypertext display device of the present invention has a user interface (designating unit) for designating an object (informing data) such as a link text attached contrived for telling an user in HTML data. When interfaced, the displayed hypertext data, including the object, is acquired by a first information acquiring unit and link information designated by the user interface is stored in a table in a pair. The displayed HTML data themselves and the HTML data indicated by the link information are sequentially acquired by data acquiring unit referring to the table and then stored in a data storage unit. Both acquired information is stored in a table in a pair. The displayed HTML data themselves and the HTML data indicated by the link information are sequentially acquired by data acquiring unit referring to the table and then stored in data storage unit.

63 Claims, 13 Drawing Sheets

OTHER PUBLICATIONS

Chinen et al., "An Interactive Prefetching Proxy Server for Improvement of WWW Latency", Proceedings of INET: The Internet: The Global Frontiers, vol. 1/3, Jun. 8, 1997.
Communication from the European Patent Office dated Feb. 21, 2003 including a Partial European Search Report.

David Koufaty et al., "Comparing Data Forwarding and Prefetching for Communication–Induced Misses in Shared–Memory MPs," *Conference Proceedings of the Jul. 13, 1998 International Conference on Supercomputing*, Jul. 17, 1998, pp. 53–60, New York, NY, USA.

* cited by examiner

FIG. 3

| LINKING SIDE URL$_1$ | LINKED SIDE URL$_1$ |
|---|---|
| LINKING SIDE URL$_2$ | LINKED SIDE URL$_2$ |
| LINKING SIDE URL$_3$ | LINKED SIDE URL$_3$ |
|  |  |
| LINKING SIDE URL$_n$ | LINKED SIDE URL$_n$ |
|  |  |

FIG. 4

| | |
|---|---|
| "LINKING SIDE" | LINKING SIDE URL$_1$ |
|  | LINKED SIDE URL$_{11}$ |
|  | LINKED SIDE URL$_{12}$ |
|  | LINKED SIDE URL$_{13}$ |
| "LINKING SIDE" | LINKING SIDE URL$_2$ |
|  | LINKED SIDE URL$_{21}$ |
|  | LINKED SIDE URL$_{22}$ |
| "LINKING SIDE" | LINKING SIDE URL$_3$ |
|  | LINKED SIDE URL$_{31}$ |
|  |  |

FIG. 14
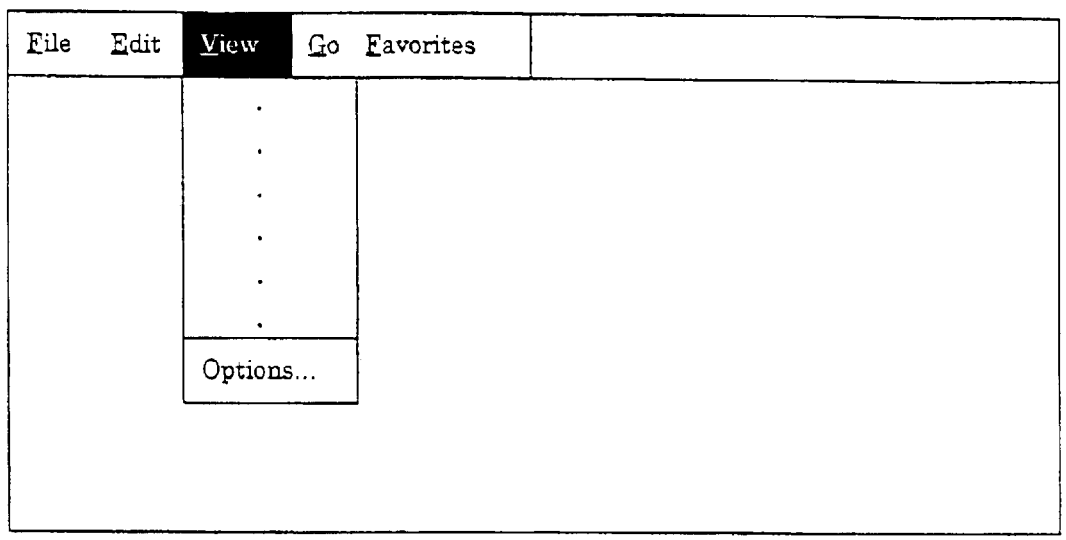
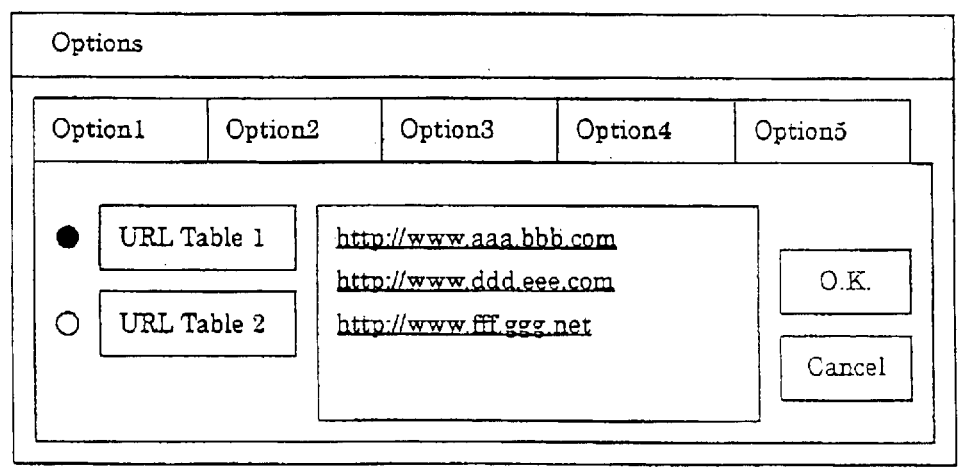

METHOD, MEDIUM, DISPLAY DEVICE, AND HYPERTEXT DISPLAY SYSTEM INCLUDING CORRESPONDENCE INFORMATION BETWEEN LOCATION INFORMATION AND LINK INFORMATION

BACKGROUND OF THE INVENTION

1. Field of the Invention

The present invention relates to a hypertext display device and a hypertext display system, and is a technique adaptable to a browser for displaying hypertext data used in WWW of the Internet, an Intranet and the like.

2. Description of the Related Art

Internet Explorer of Microsoft Inc. and Netscape Navigator of Netscape Inc. are famous each as a browser for displaying hypertext information present in the World Wide Web (WWW) of the Internet, an Intranet and the like. Using the browser, a location where a hypertext information is stored is designated and a content of the hypertext information is displayed on a personal computer. In the user interface, a user generally designates URL (Uniform Resource Locator) information directly by keyboard entry or indirectly by clicking on an icon or a character string on the display, which shows a link to other data.

Currently, a target piece of hypertext information is retrieved from the WWW by tracing the link, for example, by using a directory service.

Retrieving information by tracing the link is problemsome because (1) operation is complex and a user has to get familiar with the operation, and (2) since there are many accesses to hypertext data before the user reaches a target piece of hypertext information, time and communication cost to retrieve the information are required especially when there is employed a slow connection condition, such as dialing-up through a telephone line.

Another problem is that (3) hypertext data of the Internet or the Intranet are generally complexly linked to each other by link information and thereby, there is a possibility that a user may be confused in the course of tracing the link. Another problem arises that when a hypertext is displayed in the off-line state, in which the hypertext display device is not connected with a network, the user cannot access to linked side information in display if the linked side information is present on the network. In this case, the user necessarily has to memorize or note an address (for example, URL) of the linked side information and access the information at a later time. This is cumbersome and therefore disturbs a user's smooth reading of hypertext information on the WWW.

On the other hand, there is a technique in which a small-sized portable terminal called "mobile" is used and connected to the WWW of the Internet. Concerned with mobility, performance or a memory capacity is limited, and a browser with a simple function is loaded thereon. For that reason, when the mobile is connected to the Internet, information that the mobile can obtain is limited. For example, some mobiles cannot display image data.

Therefore, if the user wants to obtain an image datum, he has to access to the same site again using an ordinary personal computer, and enter the same operation in the computer in order to access the target information, which is further cumbersome.

SUMMARY OF THE INVENTION

A first object is a first object of the present invention is to provide a display device for displaying hypertext by which there is a reduced waiting time for connection to a site on a network where a hypertext is held, a reduced time and effort for communication over a plurality of sites, a reduced communication cost, and a reduced user confusion so that a user is not confused in the course of tracing link information.

A second object of the present invention is to enable a flexible operation so that even when a hypertext datum is displayed in the off-line state and the hypertext datum links to a hypertext present on the network, the link information is temporarily stored and when connection to the network is later established, the linked side hypertext information can be read, thereby providing a function that contributes to a smooth reading of the www.

A display device of the present invention is needed in order to achieve the above described objects. The display device is a device to display hypertext data which includes link information for other information, such as information described on a home page held at a site on the WWW of the Internet, to be adapted to a browser for operating on a computer.

A first aspect of a display device of the present invention comprises: a designating unit for designating informing data corresponding to the link information for the other data to be acquired from among informing data, comprising text and an icon showing the presence of link information in the hypertext data displayed on a display; first information acquiring unit for acquiring information showing a location of the displayed hypertext data including the informing data designated by the designating unit; second information acquiring unit for acquiring the link information specified by the informing data specified by the informing data designated by the designating unit; a storage unit comprising a table storing the location information acquired by the first information acquired unit and the link information acquired by the second information acquiring unit in correspondence to each other; and data acquiring unit acquiring the hypertext data from the location according to the location information and the hypertext data indicated by the link information from the location information and the link information are stored in the storage unit.

The device comprises a data storage unit for storing data, link information on hypertext data, and the hypertext data indicated by the link information, so that the datum can be acquired at a time when needed.

The informing data showing the presence of link information in hypertext data are an icon, a figure, a photograph, a text with a color or an underline attached thereto in the hypertext data displayed by a browser. A relation to another datum is achieved by a tag for hypertext link (generally, the tag for a link of HTML is indicated by <A> and called "anchor").

The designating unit is, for example, an user interface such as a mouse. Designation is performed, for example, by double clicks on a part where the presence of link information is indicated.

The first information acquiring unit acquires information for showing a location of the hypertext data, including the information data designated by the designating unit. The second information acquiring unit acquires link information specified by the informing data designated by the designating unit.

The location information and the link information of the hypertext datum acquired by both acquiring units are related with each other and stored in the storage unit. For example, the information pieces are stored in a table developed on a memory in a corresponding manner with each other.

The data acquiring unit acquires the hypertext data from the location according to the location information and the hypertext data indicated by the link information (both the location information and the link information are stored in the storage unit).

In that case, when a location of hypertext datum that is held on the WWW server is required to be accessed, the communication means is activated and automatically connected to a network.

If necessary, hypertext data acquired by the data acquiring unit are stored in a data storage unit, for example on a hard disc, a memory or the like.

In order that data acquirement by the data acquiring unit is to be automated, a generating unit is proposed, which generates an event and works as a trigger.

In other word, there is provided an event generating unit for generating an event at an appointed time. The data acquiring unit acquires the hypertext data from a location according to the location information and the hypertext data indicated by the link information when the event generating unit generates the event.

Connection with a network is established by a communication unit and then an event can be generated by the event generating unit on condition that the communication unit has been connected with the network. In this case, as well, it is possible that when the event is generated by the event generating unit, the data acquiring unit acquires the hypertext data from a location according to the location information and the hypertext data indicated by the link information through the network.

While in the above description, an event is generated at an appointed time or on condition of connection with a network, differently from these, when an appointed event is detected by the event detecting unit, the data acquiring unit acquires the hypertext data from the location according to the location information and the hypertext data indicated by the link information.

A first aspect of a method for displaying hypertext data according to the present invention, including link information indicating an existence of a link to other information, comprises: designating informing data corresponding to the link information to be acquired from among informing data; acquiring information which shows a location of the displayed hypertext data including the designated informing data; acquiring link information specified by the designated informing data; storing the acquired location information and the acquired link information of the hypertext data in correspondence to each other in a table; and acquiring the hypertext data from the location according to the stored location information and the hypertext data indicated by the stored link information.

The present invention can be applied to two or more information processing devices constituting a display device for displaying hypertext data including link information indicating existence of links to other data.

The display system, according to the present invention, wherein a first information processing device comprises: a designating unit for designating informing data corresponding to the link information to be acquired from among informing data, comprising text and an icon, showing the presence of link information in hypertext data displayed on a display; first information acquiring unit for acquiring information showing a location of the displayed hypertext data including the informing data designated by the designating unit; second information acquiring unit for acquiring the link information specified by the informing data designated by the designating unit; and a transmitting unit for transmitting the location information acquired by the first information acquiring unit and the link information of the hypertext data acquired by the second information acquiring unit respectively to a second information processing device. The second information processing device comprises: a receiving unit for receiving the location information and the link information of the hypertext data which have been transmitted from the first information processing device; and a data acquiring unit for acquiring the hypertext data from the location according to the received the location information and the hypertext data indicated by the link information according to the received link information.

Here, application is made to a browser operating in one of the information processing devices, for example in a portable information terminal. The informing data showing the presence of link information in hypertext data, which have been displayed, are designated by the designating unit, information showing a location of the displayed hypertext data, including the informing data designated by the designating unit, is acquired by the first information acquiring unit, and the link information specified by the informing data designated by the designating unit is also acquired by the second information acquiring unit. There may be more than one first information processing device and/or more than one second information processing device. When a function of the second information processing device is provided to the first information processing device while a function of the first information processing device is provided to the second information processing device, information pieces relating to hypertext data may be transmitted to the first information processing device from the second information device. Furthermore, if three or more information processing devices are used, information pieces relating to hypertext data can be mutually transmitted and received.

Here, the location information and the link information of the hypertext data respectively acquired by the first and the second information acquiring unit are stored in the storage unit in a related manner, for example as a table. The location information and the link information of the hypertext respectively acquired by the first and the second information acquiring unit data and stored in the storage unit are, if necessary, transmitted to the second information processing device through the transmitting unit.

The second information processing device is, for example, a desk-top computer. Location information and link information of hypertext data acquired by a portable information terminal as the first information processing device are received by the receiving unit, and hypertext data, including hypertext data which has been indicated by the link information, is acquired by the data acquiring unit according to the received information.

The second information processing device is provided with storage unit, wherein the location information and the link information of the hypertext data received by the receiving unit are stored in a related manner. In the second information processing device, the data acquiring unit acquires the hypertext data from a location according to the location information and the hypertext data indicated by link information.

In another aspect of a display device according to the present invention, the display device for displaying hypertext data including link information indicating an existence of a link to other data, comprises: a designating unit for designating informing data corresponding to specific link information for the other data to be acquired from among informing data showing the presence of link information in the hypertext data displayed on a display; a judging unit for judging whether the other data should be acquired based on the link information designated by the designating unit; and a controlling unit for acquiring the other data according to the designated link information when it is judged that the other data should be acquired, and for storing the designated link information in designated information storage unit when it is judged that the other data should not be acquired.

In other words, with a hypertext display device of the present aspect in use, according to contents of the link information, either the other data is acquired promptly or, instead of acquiring the other data, only the link information is stored in the designated information storage unit. Therefore, for example, when hypertext is displayed in the off-line state, only hypertext data stored on a local disk are immediately acquired, while the link information for hypertext data present on a network is stored in a storage unit. When the display device is later connected with the network, hypertext data is acquired according to the stored link information, thereby enabling hypertext data to be efficiently displayed.

The display device of the another aspect may further comprises a specific information storage unit for storing specific link information, wherein the judging unit judges that the other data should be acquired when the designated link information agree with the specific link information stored in the specific information storage unit, and judges that the other data should not be acquired when the designated link information do not match the specific link information.

The display device of the another aspect may further comprises a data storing unit for storing the other data, wherein the specific link information stored in the specific information storage unit is link information an user about a link to the other data stored in the data storage unit.

The display device of the another aspect may further comprises a event generating unit for generating an event at an appointed time, and a data acquiring unit for acquiring the other data from the location according to the link information stored in the designated information storage unit when the event generating unit generate the event.

The display device of the another aspect may further comprises a communication unit to connect with a network; a event generating unit for generating an event on condition that the communication unit has connected with the network; and a data acquiring unit for acquiring the other data from the location according to the link information stored in the designated information storage unit when the event generating unit generates the event.

The display device of the another aspect may further comprises a event detecting unit for detecting an appointed event; and a data acquiring unit for acquiring the other data from the location according to the link information stored in the designated information storage unit when the event detecting unit detect the event.

In a further aspect of a display device, the display device for displaying hypertext data including link information indicating an existence of a link to other data, comprises: a specific information storage unit for storing first specific link information and second specific link information; a designating unit for designating informing data corresponding to the link information for the other data to be acquired from among informing data showing the presence of link information in the hypertext data displayed on a display; a selecting unit for selecting either the first specific link information or the second specific information stored in the specific information storage unit; a judging unit for judging whether the link information designated by the designating unit agree with the specific link information selected by the selecting unit; and a controlling unit for acquiring the other data according to the designated link information when it is judged that the designated link information agree with the selected specific link information, and for storing the designated link information in a designated information storage unit when it is judged that the designated link information do not agree with the selected specific link information.

The display device of the further aspect may further comprise a data storing unit for storing the other data, wherein the first specific link information is link information indicting an existence of a link to the other data stored in the data storing unit and the second specific link information is link information indicating an existence of a link to the other data present on a network.

The display device of the further aspect may further comprises a event generating unit for generating an event at an appointed time; and a data acquiring unit for acquiring the other data from the location according to the link information stored in the designated information storage unit when the event generating unit generates the event.

The display device of the further aspect may further comprise: a communication unit to connect with a network; an event generating unit for generating an event on condition that the communication unit has connected with the network; and a data acquiring unit for acquiring the other data from the location according to the link information stored in the designated information storage unit when the event generating unit generates the event.

The display device of the further aspect further comprises an event detecting unit for detecting an appointed event; and a data acquiring unit for acquiring the other data from the location according to the link information stored in the designated information storage unit when the event detecting unit detects the event.

In another aspect of a method for displaying hypertext data according to the present invention, the method for displaying hypertext data including link information indicating an existence of a link to other data, comprises: a step of designating informing data corresponding to the link information for the other data to be acquired from among informing data showing the presence of link information in the hypertext data displayed on a display; a step of judging whether the other data should be acquired based on the designated link information; and a step of acquiring the other data according to the designated link information when it is judged that the other data should be acquired, and of storing the designated link information in designated information storage means when it is judged that the other data should not be acquired.

The means for realizing the above described functions can be achieved on a computer with use of a program and the program can be recorded on a storage medium such as CD-ROM, and distributed.

BRIEF DESCRIPTION OF THE DRAWINGS

Other objects and advantages of the present invention will become apparent during the following discussion in conjunction with the accompanying drawings, in which:

FIG. 3 is a diagram showing an example of a table for storing link information;

FIG. 4 is a diagram showing a modified example of data structure of the table;

FIG. 14 is a view showing a window for selecting a table in the eighth embodiment of the invention.

DETAILED DESCRIPTION OF THE PREFERRED EMBODIMENTS

Below, described will be embodiments of the present invention.

<First Embodiment>

Figure 1:
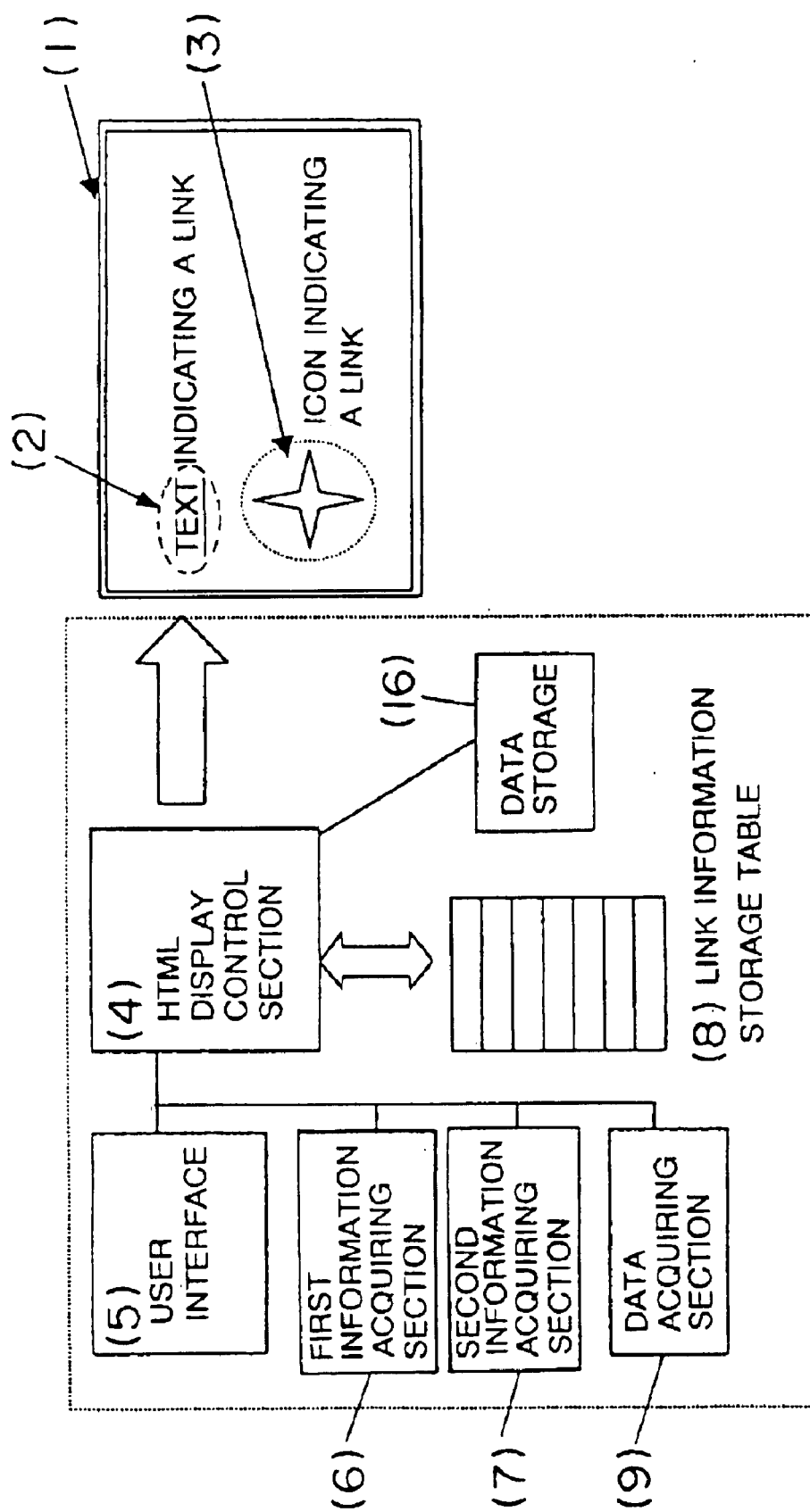
FIG. 1 is a block diagram illustrating a principle of a first embodiment of the present invention.

FIG. 1 is a block diagram illustrating a principle of a display device for displaying hypertext according to a first embodiment of the present invention. The display device of the first embodiment is applied to a browser to display hypertext information on a computer. In the first embodiment, the computer is connected to the Internet (data transport network according to TCP/IP: Transmission Control Protocol/Internet Protocol) through a network and acquires documents and the like as hypertext information stored in a server on the WWW (World Wide Web).

In other words, the hypertext display device is a device to display hypertext data, including link information to indicate the data to which the hypertext data are linked. The hypertext data are handled in a file that is described in HTML (Hypertext Markup Language) and consists of text data, layout information and hyper link information to be displayed on a display device.

According to FIG. 1, a display device of the present invention comprises: an HTML display control section (4); an user interface (5); a first information acquiring section (6); a second information acquiring section (7); a data acquiring section (9); and a data storage (16).

The HTML display control section (4) acquires hypertext data stored in a server on the Internet and displays a content of the acquired HTML data on a display. The HTML data acquired from a server on the Internet are displayed in a window (1) of a display. The HTML data includes informing data, for example a bit map (figure) such as an icon (3), and a text (2) attached with an underline. The informing data is a contrivance for informing a user that the displayed HTML data links to other HTML data. The user interface (5) as designating means designates URL (Uniform Resource Locator) which is a location of a linked side HTML data on the Internet by designating informing data (figure (3) and text (2)) on the display.

When informing data is designated by the user interface (5), the first information acquiring section (6) acquires information showing a location (URL) of HTML data displayed on the display device; wherein the HTML data includes the designated informing data. At the same time, the second information acquiring section (7) acquires link information, namely, an URL of the linked side HTML data specified by the informing data designated by the user interface (5). Data acquired by the first information acquiring section (6) and the second information acquiring section (7) are stored in a table (8) as storage means in a pair for each combination of identification data.

According to an instruction from a user, the data acquiring section (9) acquires HTML data in which informing data is described and HTML data indicated in the link information corresponding to the informing data sequentially referring to the table (8). The acquired HTML data, that is, the linked side HTML data and the linking side HTML, are stored by the data storage (16).

Figure 2:
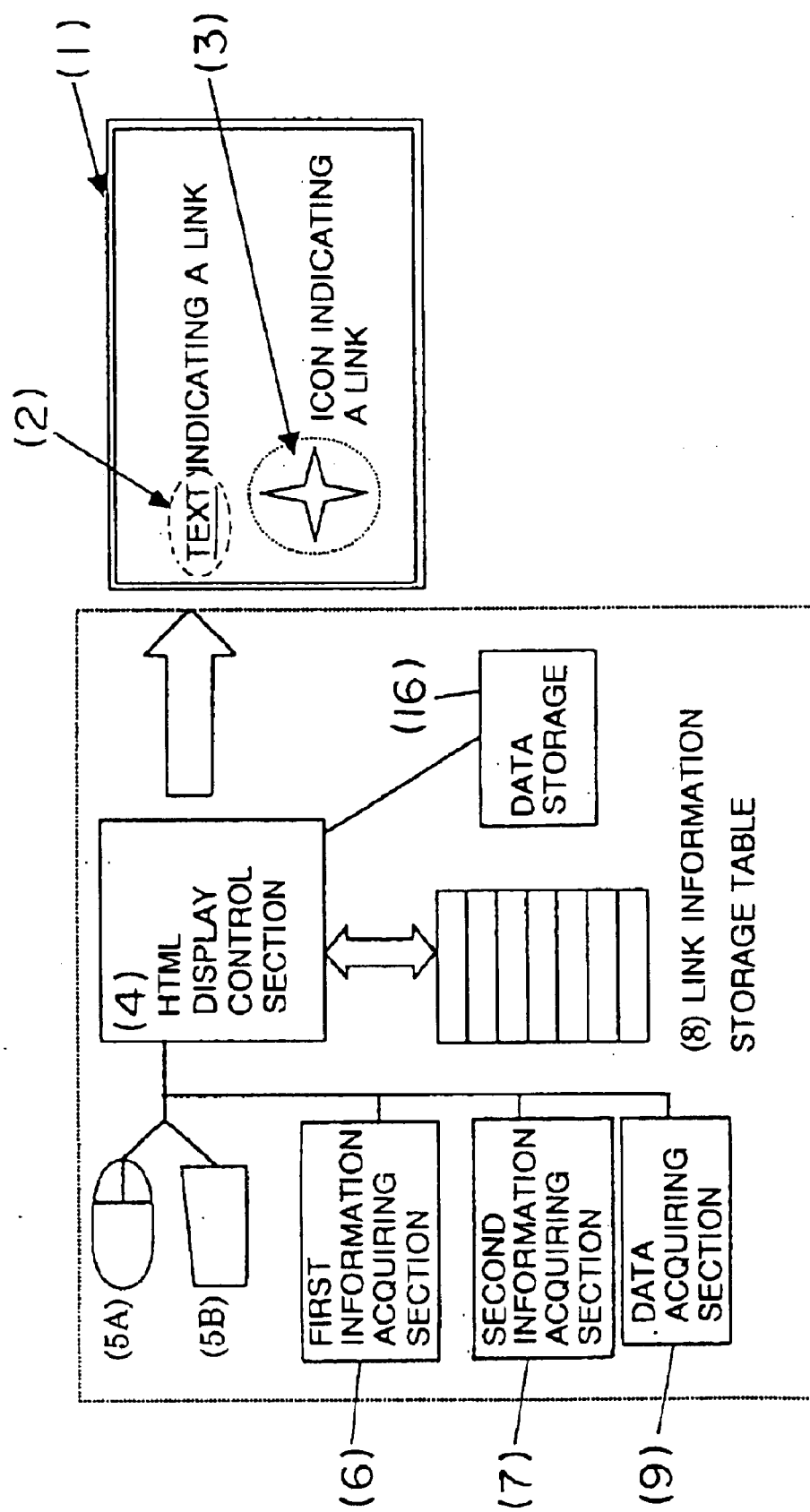
FIG. 2 is a detailed block diagram illustrating the first embodiment of the present invention.

FIG. 2 is a block diagram showing a construction of the display device of the first embodiment. FIG. 3 is a diagram showing a concrete structure of the table (8) of the present embodiment. Details of the hypertext display device of the present embodiment will be described in FIGS. 2 and 3.

In the first embodiment, the display device is realized by a software (browser) on a personal computer. The software interprets the HTML data and displays a window (1) that includes data such as a text, an image and a figure on a display of a personal computer. As shown in FIG. 2, part of the text on the window (1) is informing data in which link information for another HTML data is embedded, with emphasis by an underline (hereinafter, this informing data is referred to as link text (2)). Part of an image data is an icon (3) shown in a bit map in which link information for another HTML data is included.

A link of HTML data in the present embodiment is now described. As described above, informing data informing an user of the presence of inked information in HTML data are an icon (3), a figure and a photograph shown in a bit map, or a link text (2) attached with a color or an underline. And these informing data are related by a tag for a hypertext link. Generally, the hypertext related tag in HTML is indicated by <A> and called an "anchor".

The anchor tag is started with "<A", designating a document name (file name) of a hyper-linked side with a parameter [ HREF="filename"], and closed with a mark ">". Subsequently, a file name of HTML data (linking side HTML data) to be displayed on the window (1) is inputted. Thereafter, an anchor tag is finally completed with "</A>".

For example, in an entry of <A HREF="MaineStates.html">Maine </A>, a hyper link to a document "MaineStates.html" is prepared in a linking side HTML data file "Maine". At this point, the MaineStates.html file is required to be placed in the same directory as the "Maine" file. When the linked side file is placed in a different directory than the linking side HTML data file, the directory can be designated with a relative path from the linking side document file. For example, when a document of a file "NJStates.html" is placed in a sub-directory "AtlanticStates", the anchor tag is described as follows:

<A HREF="AtlanticStates/NJStates.html">NJStates</A>

The directory can be designated with an absolute path instead of a relative path and in such case, a method for designating the absolute path depends on a kind of a WWW server.

Furthermore, in the WWW, a location of HTML data stored in another WWW server can be designated in a standard manner using an expression called Uniform Resource Locators (URLs). URLs include a type of resource and can perform an access to resources other than the WWW (for example, Gopher, WAIS and FTP). A grammar of URL is shown as follows:

scheme://host.domain[:port]/path/filename, where a scheme is one of the group consisting of:

file: a file on a local system or Anonymous FTP ftp: a file on Anonymous FTP http: a file on a WWW server gopher: a file on a Gopher server WAIS: a file on a WAIS server news: news group telnet: connection to a host by TELNET For example, an anchor tag to link a document file to an HTML file on another WWW server is designated as follows:

<A HREF="http://www.ncsa.uiuc.edu/Generalmaru/Internet/WWW/HTMLPrimer.html">NCSA's Beginner's Guide to HTML </A>

The above is a description of concrete link information (informing data). A two-button mouse (5A) and a keyboard (5B) are equipped to the personal computer as a designating unit (user interface) for designating link information such as the link text (2) and the icon (3) displayed on the window (1). Any point on the window (1) can be clicked by a mouse cursor, which moves in an interlocking manner with the mouse (5A).

The first information acquiring section (6) for acquiring information showing a location (URL) of the HTML data themselves currently being displayed, and the second information acquiring section (7) for acquiring link information of informing data designated by the designating unit are both realized by a software. In the display device of the present embodiment, in a similar manner to a general display device, when the user moves a mouse cursor onto the link text (2) or the icon (3) on the window (1) and left-clicks the mouse button, the linked side HTML data can be acquired by the data acquiring section (9) and displayed on the window (1).

In addition to such common functions, the following operations can be performed. For example, when the mouse (5A) is left-clicked on the link text (2) while pushing down the ALT key on the key board, link information embedded in the link text (2) is taken into the table (8). The table (8) is stored in a storage means, such as a memory.

As shown in FIG. 3, in the table (8) for storing link information designated by a user, the URL of the HTML data currently being displayed, that is, a linking side URL, and the URL of HTML data which are designated by the informing data, that is, a linked side URL, are stored in a one to one correspondence for each combination of informing data. When such operations are properly performed while moving over various sites on the WWW, each of link information is accumulated in the table (8).

When the user requests to acquire the linked side HTML data, a data acquiring section (9) acquires HTML data stored in each server according to link information accumulated in the table (8). The data acquiring section (9) is realized by a software. When a command for acquiring the linked side HTML file is included in a menu loaded on the display device, a user selects the command from among the menu as needed. Then, the data acquiring section (9) acquires link information 1, 2, 3, . . . , n from the table (8) and the linked side HTML files indicated by the link information are downloaded from a related site through communication means.

Figure 5:
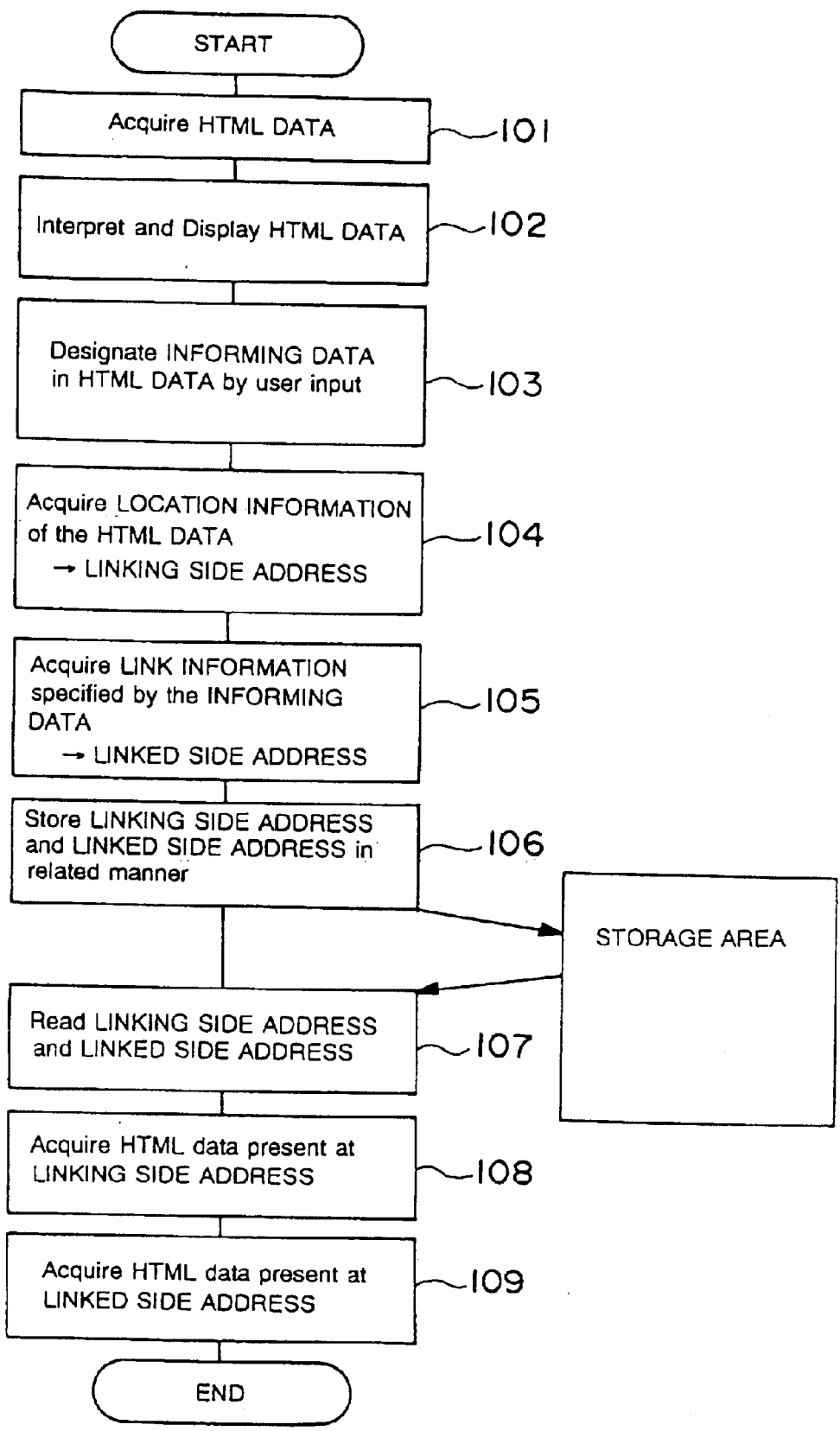
FIG. 5 is a flow chart showing procedures of the first embodiment of the present invention.

FIG. 5 is a flow chart showing procedures of the embodiment. Hereinafter, a method for displaying a hypertext of the present embodiment is described referring to FIG. 5. A user starts a browser installed in a personal computer, and thereafter, acquires HTML (hypertext) data from a server on the Internet (step 101). The acquired HTML data is stored in the data storage (16). HTML data is interpreted by the HTML display control section (4) and displayed on the display of the personal computer (step 102). Thereafter, the user designates informing data (the link text (2) or the icon (3)) in the HTML data currently being displayed by left-clicking of the mouse (5A) on the informing data while pushing down the ALT key on the keyboard (5B) (step 103).

By the first information acquiring section (6), information showing a location such as a URL of the HTML data currently being displayed, that is, a linking side address is acquired (step 104). Besides, link information, which is specified by informing data that the user has designated (a linked side address), is acquired (step 105).

Both link information acquired in steps 104 and 105 is stored in the table (8) in a corresponding manner with each other (step 106). In this way, the link information on linked side HTML data can be held in the table (8), which is not required to be displayed at the present time but able to be accessed at a later time.

When linked side HTML data is displayed on the display according to the link information held in the table (8), at step 107, the HTML display control section (4) reads both the linking side address and the linked side address, which correspond with each other from the table (8). Then, the data acquiring section (9) acquires the linking side HTML data referring the linking side address (step 108). Thereafter, the data acquiring section (9) acquires the linked side HTML data referring the linked side address (step 109). The HTML display control section (4) displays the acquired linked side HTML data on the display.

A linking side address and a linked side address of the HTML data, which have been designated by a user, are held in the table (8) in a corresponding manner with each other, and when a user requires, the necessary HTML data can be acquired according to link information held in the table (8) and displayed. The table (8) can easily store link information for HTML data, which is not necessary to be acquired immediately but is required to be acquired later, and HTML data can be easily accessed from the table. When HTML data is displayed in the off-line state, link information designated by a user is held in the table (8) and when a connection with the Internet is established, the designated HTML data can be easily acquired. Accordingly, operations to acquire HTML data on the WWW becomes easier and the number of operations going or returning over various sites while tracing the link is decreased. Hence, connection waiting time and communication costs are reduced.

In the present embodiment, a mouse is left-clicked while the ALT key on the keyboard is pushed down for storing informing data (link information) designated by a user in the table (8); however, a right-click or another method can be applied.

In the table (8) shown in FIG. 3, only one linked side URL is stored for one linking side. However, in many cases, a plurality of HTML data are linked to one linking side. Therefore, in order to save memory, a data structure as shown in FIG. 4 may be adopted. The left column of the table is a flag area and when a flag designated "linking side"

is attached therein, a corresponding URL in the right column indicates a linking side URL. When no flag designated "linking side" is attached in the flag area, a corresponding URL in the right column indicates a linked side URL.

<Second Embodiment>

Figure 6:
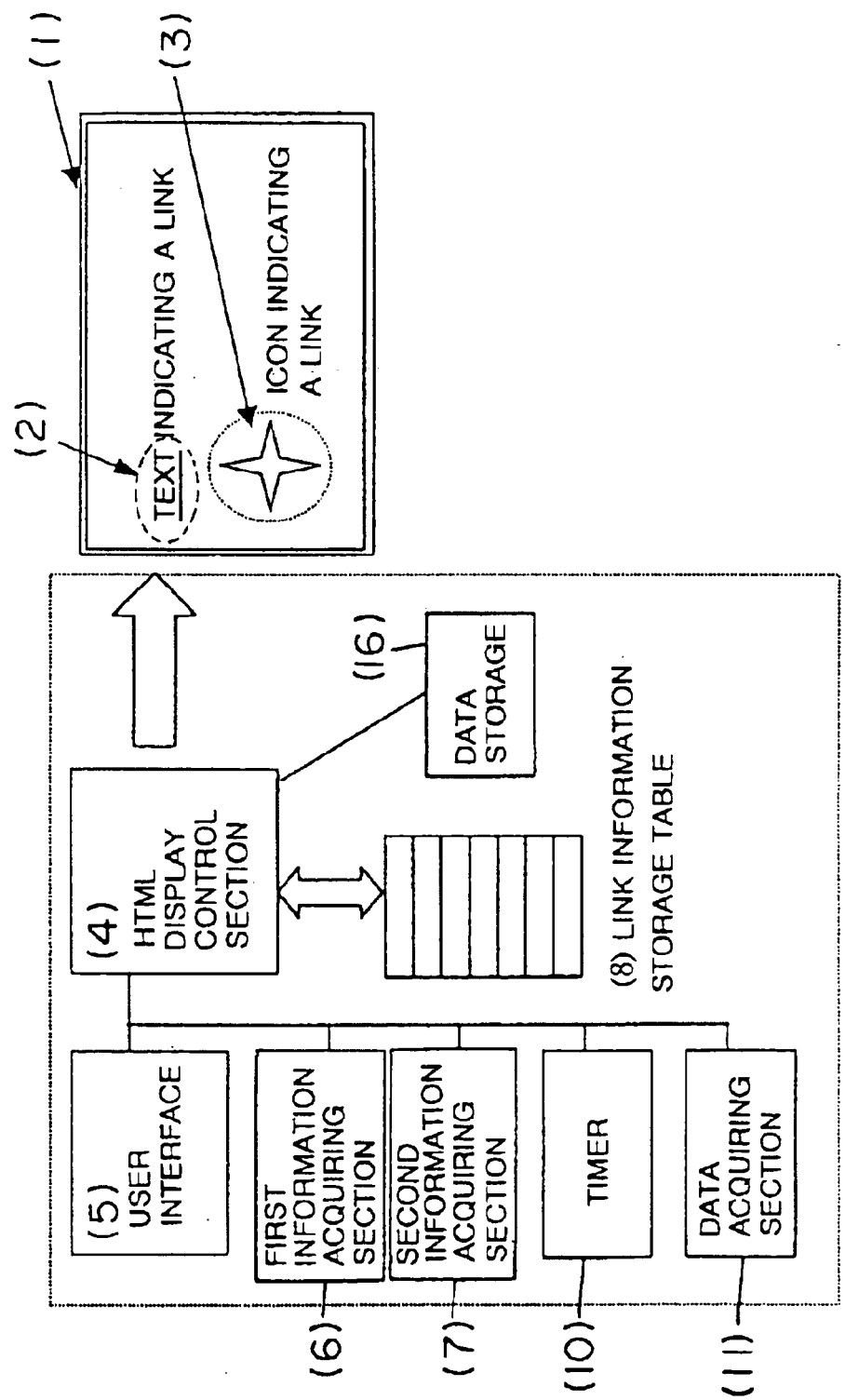
FIG. 6 is a block diagram showing a second embodiment of the present invention.

FIG. 6 is a block diagram showing a construction of a display device for displaying hypertext of a second embodiment of the present invention. The display device of the second embodiment further comprises a timer (10) that generates an event at a time appointed by a user, but the other constituents are same as the first embodiment.

A display device of the present embodiment, as in the first embodiment, comprises: the HTML display control section (4) in which HTML data (hypertext) acquired from a server on the Internet is interpreted and displayed on the display; the user interface (5) (a designating unit) such as the mouse and the keyboard which a user uses for designating informing data (the link text (2) and the icon (3)) showing a link in HTML data in display; the first and second information acquiring sections (6), (7) for acquiring a linking side address and a linked side address from informing data designated by the user interface (5); and the table (8) for storing link information acquired from the information acquiring means (6), (7) in a corresponding manner with each other. The hypertext display further comprises a timer (10) that generates an event on time which a user appoints. In the present embodiment, a data acquiring section (11) acquires designated HTML data according to a user request as in the first embodiment butand designated HTML data according to an event that is generated by the time (10).

Link information on data which is not necessary to be acquired immediately but is necessary to be read later is stored in the table (8), and designated HTML data can be automatically acquired from each server according to information from the table (8) on time that is appointed by the timer (10). Even while a user is engaged in other work, necessary HTML data can be acquired when the event is generated by the timer (10); thereby enabling the user to save time and effort acquiring HTML data.

<Third Embodiment>

Figure 7:
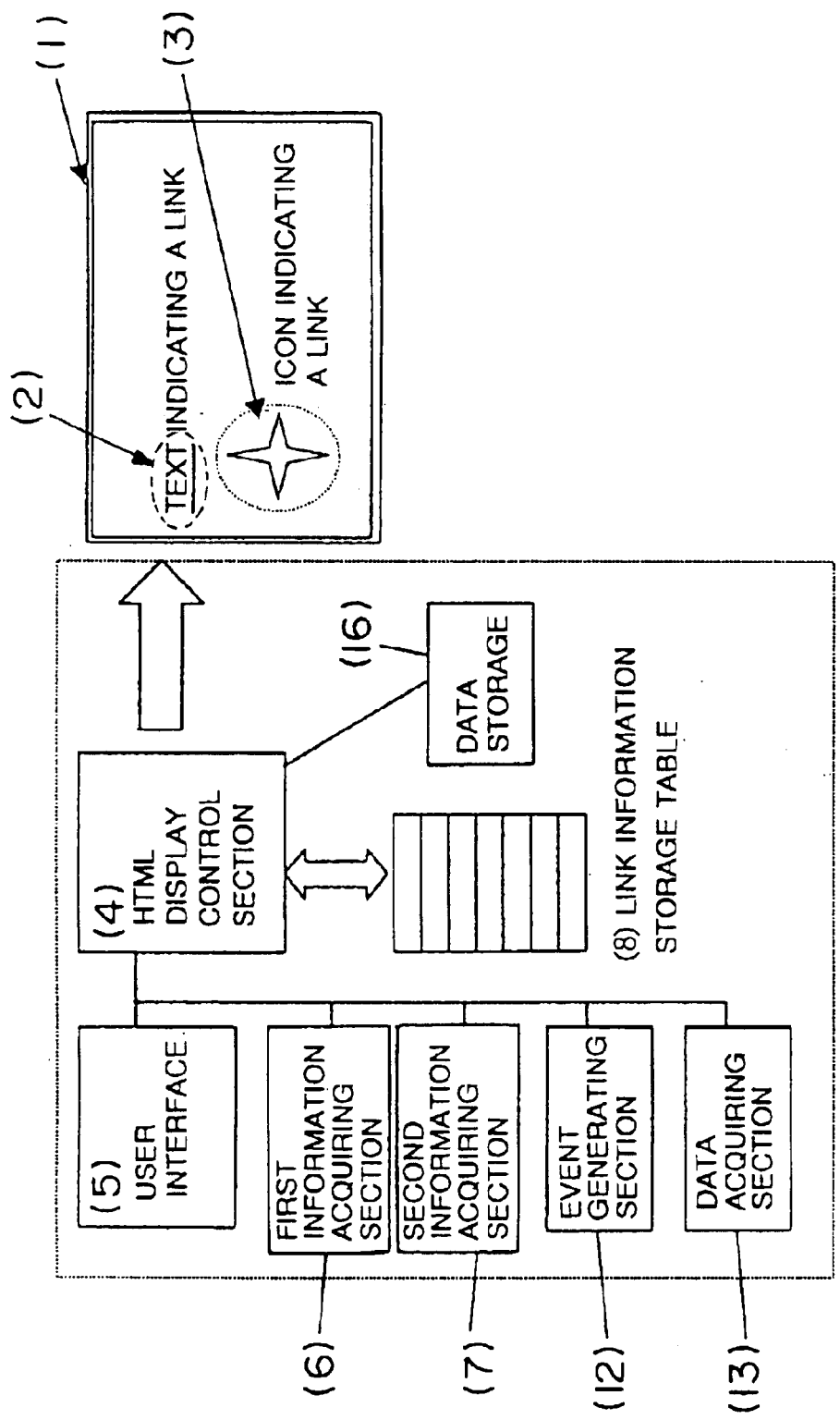
FIG. 7 is a block diagram showing a third embodiment of the present invention.

FIG. 7 is a block diagram showing a construction of a display device for displaying hypertext of a third embodiment of the present invention. The display device of the third embodiment further comprises an event generating section (12) for generating an event on condition that the hypertext display device is connected with a network. The other constituents of the third embodiment are the same as the first embodiment. When a display device of the present embodiment is connected to a network, the event generating section (12) detects the connection and generates an event to acquire the HTML data. A data acquiring section (13) then detects the generation of the event and sequentially acquires the designated HTML data according to the link information stored in the table (8).

With such a construction when HTML data has been displayed in the off-line state, a linked side HTML data designated by the user can be automatically acquired when the hypertext display device is connected with a network.

<Fourth Embodiment>

Figure 8:
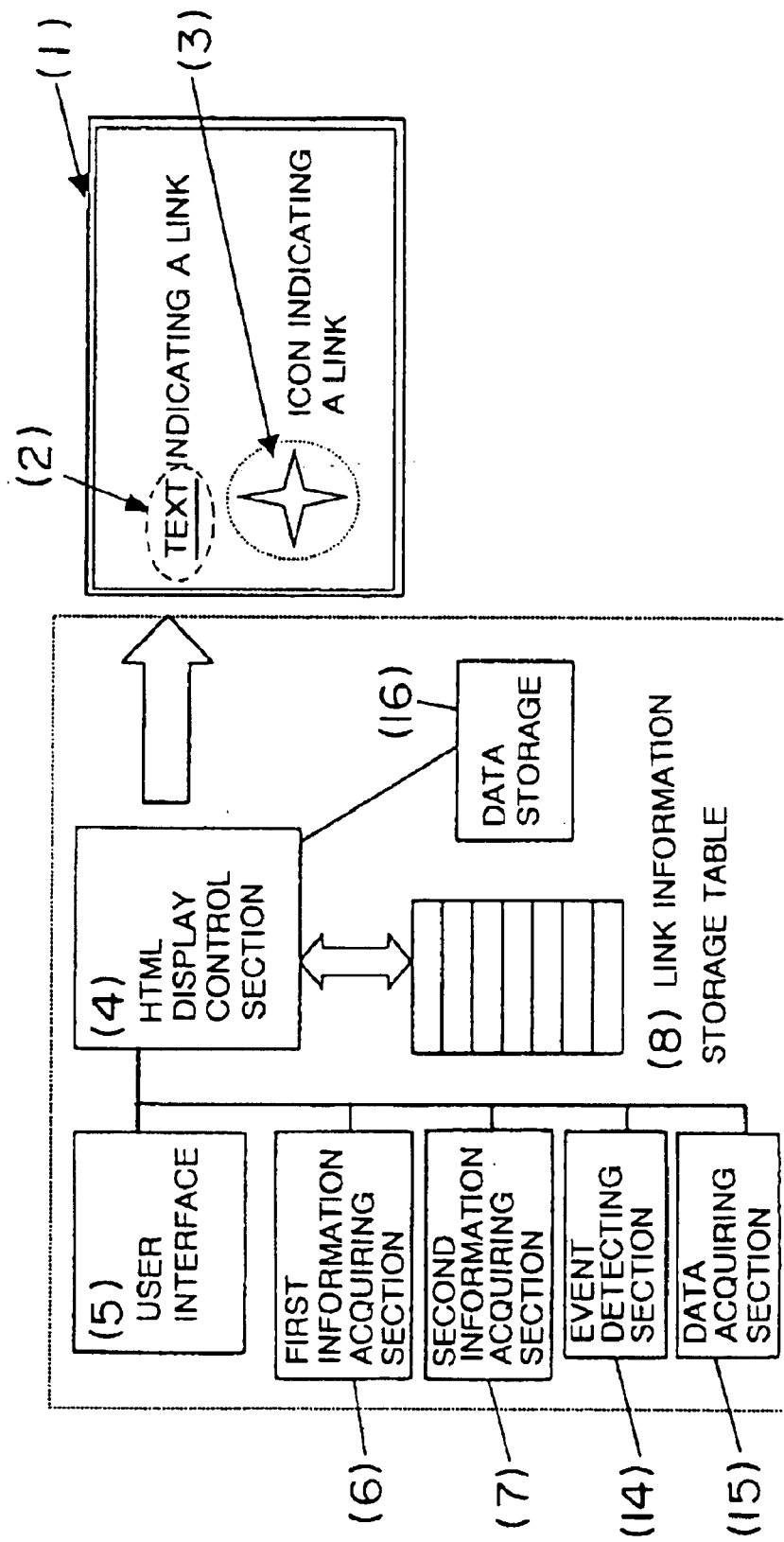
FIG. 8 is a block diagram showing a fourth embodiment of the present invention.

FIG. 8 is a block diagram showing a construction of a display device for displaying hypertext of a fourth embodiment. The fourth embodiment further comprises an event detecting section (14) for detecting an event when the event has been generated. The other constituents of the fourth embodiment are the same as in the first embodiment. For example, event detected by the event detecting section (14) may be a users request to close a software.

As described above, the hypertext display device is realized on a personal computer on which a software is loaded. When a user has requested to close the software, the event detecting section (14) detects the request. Then, a data acquiring section (15) sequentially acquires designated HTML data according to the table (8).

With such a construction in use, for example, when the user finishes use of the display device, the data acquiring section sequentially acquires designated HTML data. That is, when HTML data, which is not necessary at the present time for a user but becomes necessary to be read later, is designated, the designated HTML data is automatically acquired and stored in the data storage (16) after the software is closed. Therefore, the user does not have to request to acquire of the HTML data at a later time, and can read the HTML data any time at.

<Fifth Embodiments

Figure 9:
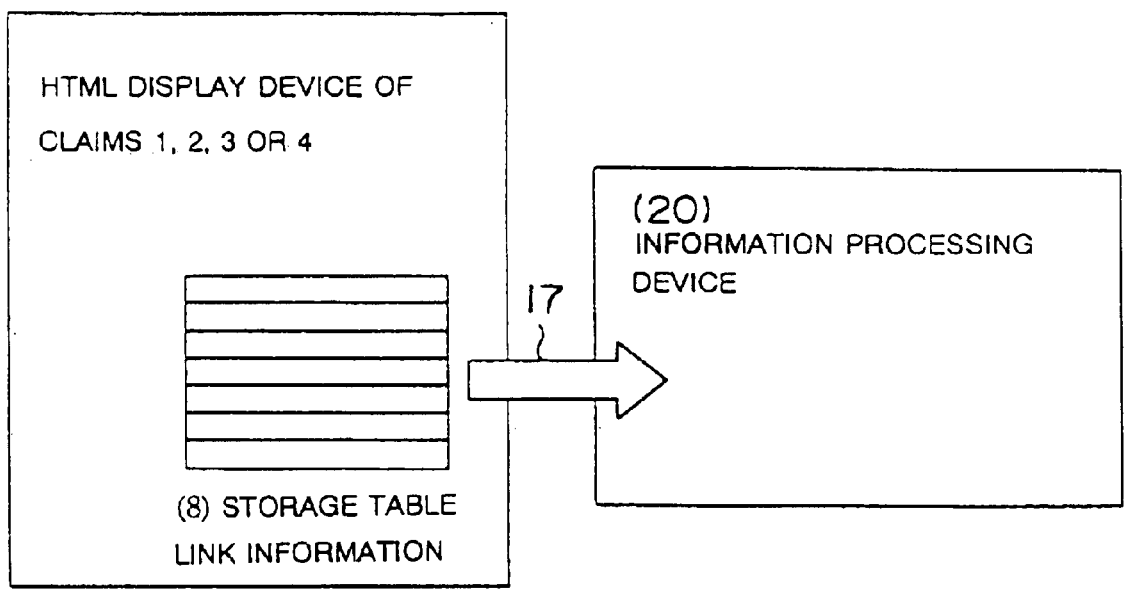
FIG. 9 is a block diagram showing a fifth embodiment of the present invention.

FIG. 9 is a diagram showing a construction of a display device for displaying hypertext according to a fifth embodiment. The embodiment further comprises a transfer section (17) for transferring link information stored in the table (8) equipped to the display devices of the above described embodiments to another information processing device.

In other words, in the above described embodiments, each link information stored in the table (8), in which the linking side address and a linked side address of HTML data designated by a user are stored in a corresponding manner with each other, is read by the transfer section (17) and transferred to another information processing device (20). Then, in the information processing device (20), each link information stored in the table (8) is referred to and necessary HTML data are acquired.

Therefore, since a table (8) in which link information is stored can be transferred to another information processing device, the necessary HTML data can be acquired at another information processing device without any repetition of the same operation.

<Sixth Embodiment>

Figure 10:
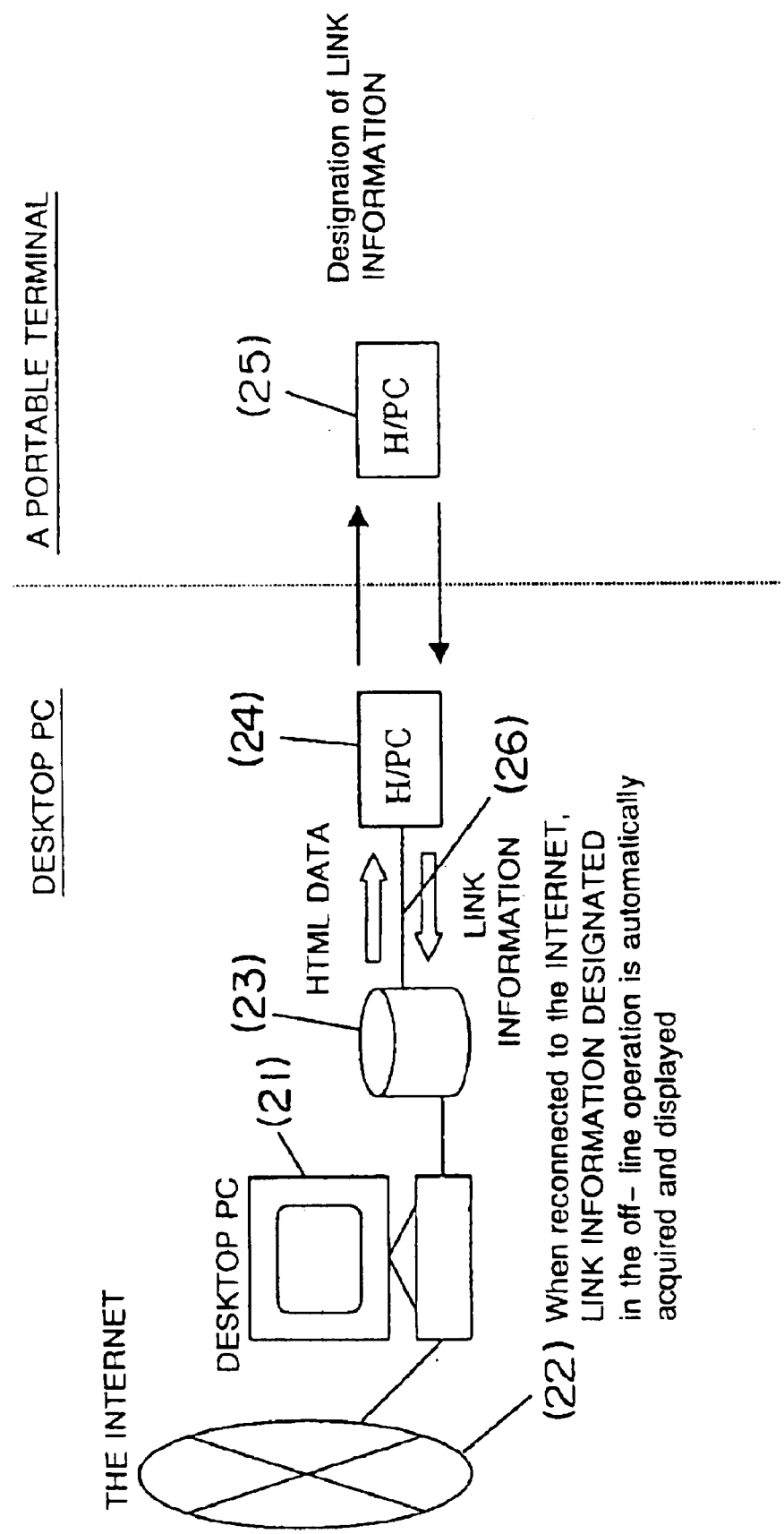
FIG. 10 is a block diagram showing a sixth embodiment of the present invention.
Figure 11:
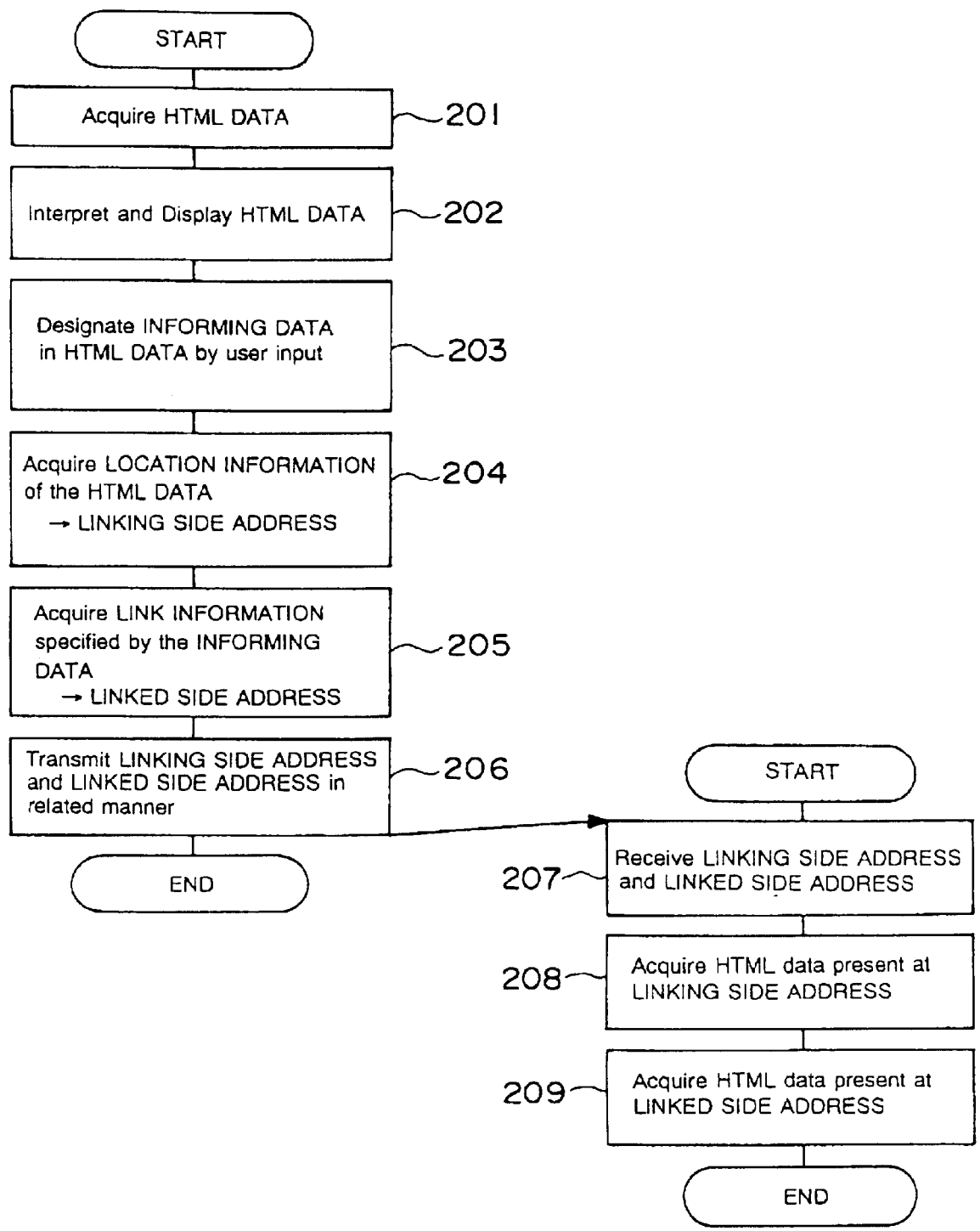
FIG. 11 is a flow chart showing procedures of the sixth embodiment of the present invention.

FIG. 10 is a block diagram showing a construction of a display device for displaying hypertext according to a sixth embodiment. FIG. 11 is a flow chart showing procedures of the sixth embodiment. In the sixth embodiment, there is shown an example in which the transfer section (17), as described in the fifth embodiment, is equipped to the display device of the first embodiment.

The display device of the present embodiment is realized by execution by a CPU (not shown) of a program stored on a hard disk (23) of a desktop PC (21). The desktop PC (21) is connected to the Internet (22) as a network through a modem (modulator/demodulator) and a telephone line (both the modem and the telephone line are not shown in the figure). A portable type terminal (a hand held computer, hereinafter referred to as "H/PC") (24), is another display device that is realized by execution by CPU of a program stored in the hard disk.

The desktop PC (21) acquires HTML data from the W-WW and the HTML data is downloaded on the hard disk (23). The desktop PC (21) and H/PC (24) are connected to each other by a serial interface (transfer means) (26). With the connection, data which are respectively stored in hard disks can mutually be transferred. Besides, H/PC (24) can singly be used in connection to the Internet as well.

Hereinafter, procedures for displaying hypertext data of the present embodiment using a plurality of display devices will be described, in reference to FIGS. 2, 9, 10. A user starts a browser for displaying HTML data using a H/PC (24) and acquires HTML data (hypertext data) from a server on the Internet (step 201). The acquired HTML data is interpreted and displayed on the display of the H/PC (24) (step 202). Since HTML data is displayed in a simplified format, image data and the like are not displayed. A user reads a displayed HTML data and designates necessary informing data (step 203). Then, information (a linking side address) showing a location of the HTML data currently being displayed is acquired (step 204). Link information (a linked side address) specified by informing data is acquired (step 205). The linked side address and the linking side address are transmitted to the desktop PC (21) through the serial interface (26) while keeping a corresponding relation with each other (step 206). By such procedures, the link information of the designated HTML data, including data that cannot be displayed on the portable type terminal (H/PC) (24)), can be transferred from H/PC (24) to the desktop PC (21) so that all the data can be displayed.

The desktop PC (21) acquires the link information that has been transmitted from the H/PC (24) (step 207). Then, according to the acquired link information, the HTML data existing in a linking side address is acquired by the data acquiring section (9) (step 208). Then, HTML data existing in a linked side address is acquired. Both HTML data are displayed on the display of the desktop PC (step 209).

When a user accesses the Internet from a place outside of the office using a H/PC (24) loaded with a browser which displays in a simplified manner, the user may encounter a case where HTML data can be displayed on H/PC (24), whereas some information is not displayed. When the user desires to read the information not displayed the information including the address of the HTML data is transmitted to another information processing device such as a desktop PC (21) through a serial interface and thereafter, all the information can be displayed using a browser which can be normally display HTML data in a normal manner. Accordingly, the same operation as operated in the H/PC (24) is not repeated in the desktop PC (21) and the HTML data that the user desires to read can be displayed on the desktop PC (21).

When a display device of the present embodiment is employed, a method as described below will also be able to be used. First of all, HTML data on the WWW are acquired by a desktop PC (21) and the HTML data are transferred to an H/PC (24). The transferred HTML data are interpreted and displayed on the H/PC (24) in the off-line state when connection with the Internet is not established. While the HTML data is being displayed on the H/PC (24), a user designates informing data including link information that the user desires to read later. The link information designated by the user is accumulated in the H/PC (24). And when the H/PC (24) is again connected with the desktop PC (21), the link information is transferred to the desktop PC (21). The HTML data which have not been able to be read on the H/PC (24) are acquired by the desktop PC (21) and displayed thereon.

<Seventh Embodiment>

Figure 12:
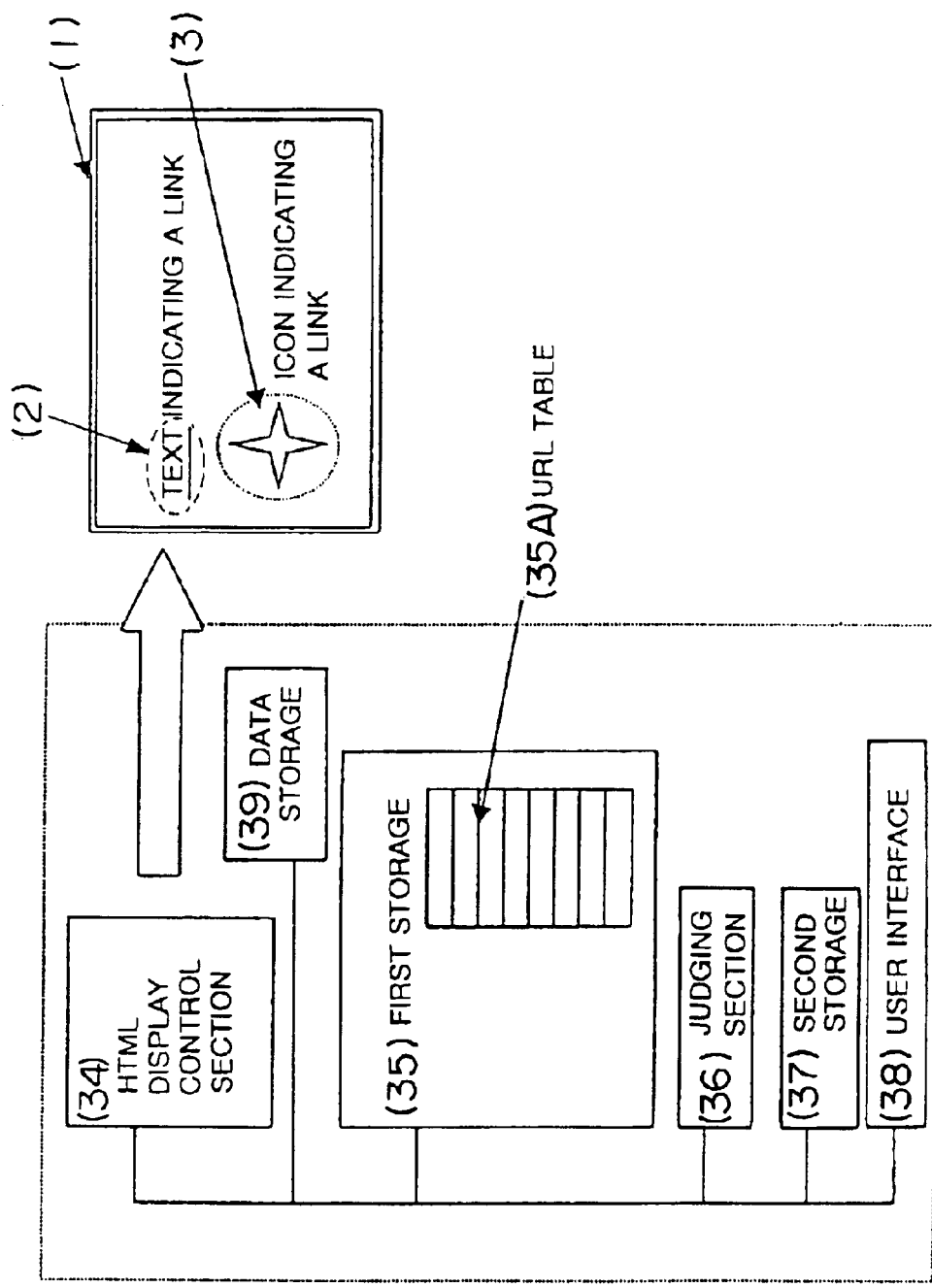
FIG. 12 is a block diagram showing a seventh embodiment of the invention.

FIG. 12 is a block diagram showing a construction of a display device for displaying hypertext of a seventh embodiment of the. The display device of the seventh embodiment comprises: a hypertext display control section (34), a first storage (35); a second storage (37); a judging section (36); an user interface (38); and a data storage (39).

The hypertext display control section (34) acquires HTML data from a server on a network, interprets the acquired HTML data and displays the data on the display. As in the above described embodiments, the displayed HTML data includes informing data such as a link text (2) and an icon (3) showing a link to another HTML data. The user interface (38) designates the informing data in the HTML data displayed on the display by the hypertext display control section (34). The acquired HTML data are held in the data storage (39) such as a hard disk.

The first storage (35) stores a specific link information (a linking side URL and a linked side URL) that is predetermined by a user. The first storage section (35) of the present embodiment has a table (35A) in which a linking side address and a linked side address on a local disk of HTML files, which are downloaded from WWW for a predetermined hierarchy and held in the data storage (39), are stored in a corresponding manner. The table (35A) has a similar structure as the tables (8) of the above described embodiments, as shown in FIG. 3 or 4.

The judging section (36) compares link information in informing data designated by a user with link information stored in the table (35A) of the first storage section (35) and determines whether linked side HTML data should be displayed immediately or at a later time. That is, the judging section (36) compares whether the link information designated by the user agrees with the link information stored in the table (35A). When a linked side address of designated HTML data agrees with the link information registered in the table (35A), the hypertext display control section (34) acquires the corresponding HTML data from the data storage (39) and displays the HTML data.

When a linked side address in link information designated by a user does not agree with the link information registered in the table (35A), both an address of the server that stores the HTML data currently being displayed and the linked side address in designated link information are stored in the second storage section (37) in a corresponding manner. In the cases when a user requested or when connection is established with the Internet, the HTML data designated by the user are acquired based on link information stored in the second storage section (38).

A display method for hypertext data according to the present embodiment will be described as follows. A display device of the present embodiment is realized by execution by the CPU of a program stored on a hard disk of a personal computer, as described in the first embodiment.

Some programs are available in which HTML files on the WWW are automatically downloaded for predetermined numbers of hierarchy. Each of such programs stores the downloaded HTML data in a local auxiliary storage device, such as a hard disk, and mutual link information is stored as local values to assign a new link relation. With such procedures, mutual links between the HTML data are all confined within a closed space in a local environment. Therefore, time for acquiring the HTML data in a network is shortened and a high speed operation for displaying the HTML data can be realized.

Each HTML data acquired by such a program are stored in the data storage (39) of the display device. Link information of each HTML data that has been stored as local values is registered in the table (35A) of the first storage (35).

The user reads HTML data, which is displayed on the display by the HTML display control section (34) after being acquired by the program, in the off-line state where connection with a network is not established. Thereafter, the user designates informing data (a link text (2) or an icon (3)) showing a link to the other HTML data which the user desires to acquire by a user interface (38), such as the mouse or the keyboard.

The judging section (36) compares the designated link information including a linking side address and a linked side address with link information registered in the table (35A). When the linked side address designated by the user agrees with one piece of the link information registered in the table (35A), that is, when designated HTML data is already stored in the data storage (39) by being acquired by the program to automatically download HTML data, HTML data is acquired from the data storage according to the linked side address by the HTML display control section (34) and displayed on the display thereof.

When it is determined that a linked side URL of HTML data designated by a user does not agree with one piece of the link information registered in the table (35A), that is, when the URL of HTML data designated by the user is still on the Internet, link information including a linking side address and a linked side address thereof are stored in the second storage section (37) in a related state with each other. At this point, since the hypertext display device is in the off-line state, the HTML data designated by a user cannot be acquired. Thereafter, when the display device is connected with the Internet, HTML data designated by the user is acquired based on the link information stored in the second storage (37).

In such a way, a display device of the present embodiment determines whether or not linked side HTML data designated by a user are stored on a local disk (the data storage (39)) when the user reads an Internet in the off-line state. When the designated HTML data are stored in the data storage (39), HTML data is immediately acquired and displayed. But when the HTML data are not stored in the data storage (39), the link information is temporarily stored in the second storage section (37) and the HTML data is later acquired from the WWW. In other words, the determining section (36) determines whether desired HTML data are stored in the data storage (39) or the desired HTML data have to be acquired from a server on the Internet, the user side does not make this determination thereby reducing time and effort on the user side. Furthermore, when a user reads HTML in the off-line state, a waste of connection cost or time due to useless access to a network can be prevented from occurring.

<Eighth Embodiment>

Figure 13:
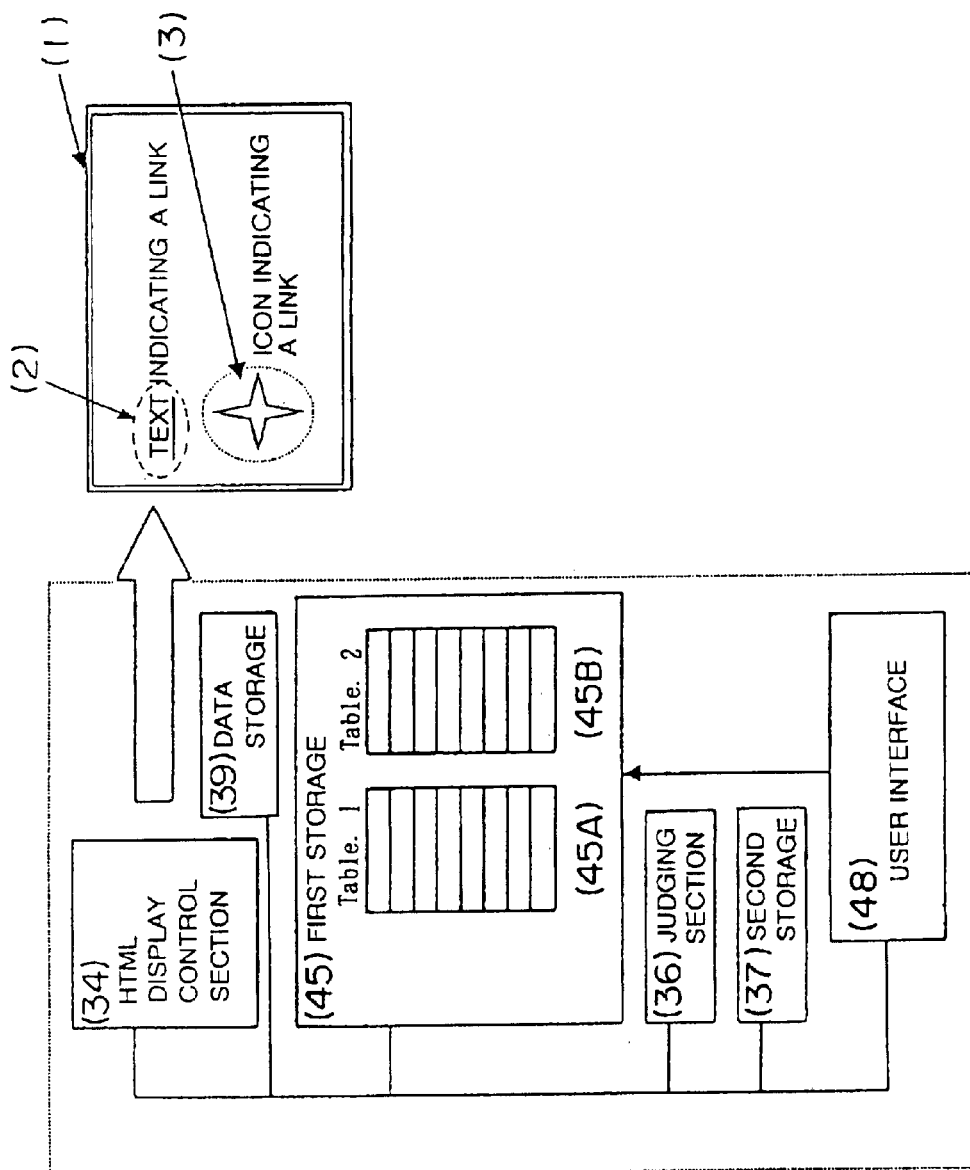
FIG. 13 is a block diagram showing an eighth embodiment of the invention.

FIG. 13 is a block diagram showing a construction of a display device for displaying hypertext according to a eighth embodiment. The eighth embodiment comprises two tables in the first storage. The other constituents of the eighth embodiment are the same as in the seventh embodiment.

In the first storage (45), tables (45A), (45B) holding link information of HTML data are stored. In the table (45A), stored is an URL of HTML data stored in the data storage (39) which have already downloaded same as in the table (35A) of the seventh embodiment. In the other one (45B) of the tables, URL's of HTML data which the hypertext display device can access at speed, such as HTML data stored in a server on a LAN of a office. The user interface (48) designates informing data on HTML data displayed on the display and selects which of the tables (45A), (45B) should be effective for the judging section (36) to determine the time when the HTML data is acquired.

FIG. 14 is a diagram showing an example of a window for selecting a table by the user interface (48). As shown in the figure, when a command "Options" is selected from a menu on the window of the display, a window is displayed to select which of the tables (45A) or (45B) is effective. A user designates one of the tables from the window with the user interface (48), such as the mouse. The table (45A) is selected in the FIG. 14.

A method for displaying a hypertext data according to the present embodiment is described as follows. A user selects the table (45B) in which URL's of HTML data stored in a server on the office LAN is registered and reads HTML data displayed on the display in the state where the display device is connected to the office LAN. The user designates informing data showing a link to another HTML data which the user desires to acquire, with the user interface (48).

The judging section (36) compares a linked side URL shown by the informing data designated by the user with a URL stored in the selected table (45B). When the address designated by the user matches the address stored in the table (45B), that is, in the case where the linked side HTML data can be acquired at a high speed since the HTML data designated by a user is stored in a server on the office LAN, the designated HTML data are immediately acquired and displayed. On the other hand, when the designated linked side address is not stored in the table (45B), the linked side address is stored in the second storage (37) in a corresponding manner to the linking side URL. At this point, the designated HTML data is not displayed and is later acquired on demand by the user.

When the display device is a note book type PC in the state where the PC is not connected to a network such as a LAN, a user selects the table (45A) in which URL of HTML data stored in the data storage (39) is registered and reads displayed HTML data. In this case, as in the case of the seventh embodiment, only when HTML data designated by the user is stored in the data storage (39), the HTML data is immediately acquired. In the other cases, the linked side URL is stored in the second storage (37) and the HTML data is acquired at a later time when connection with a network is established.

In such a way, since a table can be selected to judge when the designated HTML data should be acquired according to a use environment of a display device, an acquirement and a display of HTML data can efficiently be performed.

This invention being thus described, it will be obvious that the same may be varied in various ways. Such variations are not to be regarded as departure from the spirit and scope of the invention, and all such modifications would be obvious for one skilled in the art intended to be included within the scope of the following claims.

What is claimed is:

1. A device displaying hypertext data including link information indicating an existence of a link to other data, comprising:

a designating unit designating informing data corresponding to the link information for the other data to be acquired from among informing data, comprising text and an icon, showing the presence of link information in the hypertext data displayed on a display;

a first information acquiring unit acquiring information showing a location of the displayed hypertext data including the informing data designated by the designating unit;

a second information acquiring unit acquiring the link information specified by the informing data designated by the designating unit;

a storage unit comprising a table storing the location information acquired by the first information acquiring unit and the link information acquired by the second information acquiring unit in correspondence to each other; and a data acquiring unit acquiring the hypertext data from the location according to the location information and the other data indicated by the link information from the location information and the link information are stored in the storage unit, wherein the first and second information acquiring units acquire respective information related to the designated informing data when the designated informing data is displayed in an off-line state such that the designated informing data can be subsequently read in an on-line state.

2. A device according to claim 1, further comprising:
a data storage unit storing the hypertext data and the other data acquired by the data acquiring unit.

3. A device according to claim 1, further comprising:
an event generating unit generating an event at an appointed time,
wherein the data acquiring unit acquires the hypertext data from the location according to the location information and the other data indicated by the link information when the event generating unit generates the event.

4. A device according to claim 1, further comprising:
a communication unit to connect with a network; and
an event generating unit generating an event on condition that the communication unit having connected with the network,
wherein when the event is generated by the event generating unit, the data acquiring unit acquires the hypertext data from the location according to the location information and the other data indicated by the link information.

5. A device according to claim 1, further comprising:
an event detecting unit detecting an event,
wherein when the event detecting unit detects the event, the data acquiring unit acquires the hypertext data from the location according to the location information and other data indicated by the link information.

6. The device according to claim 1, wherein the link is a hypertext link.

7. A method for displaying hypertext data including link information indicating an existence of a link to other data, comprising:
designating informing data corresponding to the link information for the other data to be acquired from among informing data, comprising text and an icon, which show the presence of link information in the hypertext data displayed on a display;
acquiring information which shows a location of the displayed hypertext data including the designated informing data;
acquiring link information specified by the designated informing data;
storing the acquired location information and the acquired link information of the hypertext data in correspondence to each other in a table; and
acquiring the hypertext data from the location according to the stored location information and the other data indicated by the stored link information,
wherein respective location and link information is acquired relating to the designated informing data when the designated informing data is displayed in an off-line state such that the designated informing data can be subsequently read in an on-line state.

8. The method according to claim 7, further comprising:
storing the hypertext data and the other data acquired by the acquiring the hypertext data.

9. The method according to claim 7, further comprising:
generating an event at an appointed time, wherein the acquiring the hypertext data acquires the hypertext data from the location according to the location information and the other data indicated by the link information when the event is generated.

10. The method according to claim 7, further comprising:
connecting with a network; and
generating an event on condition of connecting with the network,
wherein when the event is generated, the acquiring the hypertext data acquires the hypertext data from the location according to the location information and the other data indicated by the link information.

11. The method according to claim 7, further comprising:
detecting an event,
wherein when the detecting detects the event, the acquiring the hypertext data acquires the hypertext data from the location according to the location information and other data indicated by the link information.

12. The method according to claim 7, wherein the link is a hypertext link.

13. A display system comprising:
at least two information processing devices constituting a display device for displaying hypertext data including link information indicating an existence of a link to other data;
a first information processing device comprising:
a designating unit designating informing data corresponding to the link information for the other data to be acquired from among informing data, comprising text and an icon, showing the presence of link information in hypertext data displayed on a display;
first information acquiring unit acquiring information showing a location of the displayed hypertext data including the informing data designated by the designating unit;
a second information acquiring unit acquiring the link information specified by the informing data designated by the designating unit; and
a transmitting unit transmitting the location information acquired by the first information acquiring unit and the link information of the hypertext data acquired by the second information acquiring unit in correspondence with each other to a second information processing device, and
the second information processing device comprising:
a receiving unit receiving the location information and the link information of the hypertext data which have been transmitted from the first information processing device; and
a data acquiring unit acquiring the hypertext data from the location according to the received the location information and the other data indicated by the link information according to the received link information,
wherein the first and second information acquiring units acquire respective information related to the designated informing data when the designated informing data is displayed in an off-line state such that the designated informing data can be subsequently read in an on-line state.

14. A display system according to claim 13, wherein the first information processing device further comprising:
a storage unit storing the location information acquired by the first information acquiring unit and the link infor mation acquired by the second information acquiring unit for the correspondence to each other, wherein the transmitting unit transmits the location information and the link information of the hypertext data both stored in the storage unit to the second information processing device.

15. A display system according to claim 13, wherein the second information processing device further comprising:

a storage unit storing the location information and the link information both received by the receiving unit for the correspondence to each other, wherein the data acquiring unit acquires the hypertext data from the location according to the location information and the other data indicated by the link information.

16. The display system according to claim 13, wherein the link is a hypertext link.

17. A storage medium for a computer on which a program for displaying hypertext data including link information indicating an existence of a link to other data is stored, said program when executed by the computer causes the computer to execute the functions comprising:

designating informing data corresponding to the link information for the other data to be acquired from among informing data, comprising text and an icon, which shows the presence of link information in the hypertext data displayed on a display;

acquiring information which shows a location of the hypertext data displayed including the designated informing data;

acquiring link information specified by the designated informing data;

storing the acquired location information and the acquired link information of the hypertext data in correspondence to each other; and acquiring the hypertext data from a location according to the stored location information and the other data indicated by the stored link information, wherein respective location and link information is acquired relating to the designated informing data when the designated informing data is displayed in an off-line state such that the designated informing data can be subsequently read in an on-line state.

18. The medium according to claim 17, further comprising:

storing the hypertext data and the other data acquired by the acquiring.

19. The medium according to claim 17, further comprising:

generating an event at an appointed time, wherein the acquiring acquires the hypertext data from the location according to the location information and the other data indicated by the link information when the event is generated.

20. The medium according to claim 17, further comprising:

connecting with a network; and generating an event on condition of connecting with the network, wherein when the event is generated, the acquiring acquires the hypertext data from the location according to the location information and the other data indicated by the link information.

21. The medium according to claim 17, further comprising:

detecting an event, wherein when the detecting detects the event, the acquiring acquires the hypertext data from the location according to the location information and other data indicated by the link information.

22. The medium according to claim 17, wherein the link is a hypertext link.

23. A device displaying hypertext data including link information indicating an existence of a link to other data, comprising:

a designating unit designating informing data corresponding to the link information for the other data to be acquired from among informing data, comprising text and an icon, showing the presence of link information in the hypertext data displayed on a display;

a judging unit judging whether the other data should be acquired based on the link information designated by the designating unit; and a controlling unit acquiring the other data according to the designated link information when it is judged that the other data should be acquired, and storing the designated link information in designated information storage unit when it is judged that the other data should not be acquired, wherein the link information is acquired relating to the designated informing data when the designated informing data is displayed in an off-line state such that the designated informing data can be subsequently read in an on-line state.

24. A device according to claim 23, further comprising:

a specific information storage unit storing specific link information, wherein the judging unit judges that the other data should be acquired when the designated link information agree with the specific link information stored in the specific information storage unit, and judges that the other data should not be acquired when the designated link information do not agree with the specific link information.

25. A device according to claim 24, further comprising:

a data storing unit storing the other data, wherein the specific link information stored in the specific information storage unit is link information indicating an existence of a link to the other data stored in the data storage unit.

26. A device according to claim 23, further comprising:

a communication unit to connect with a network;

an event generating unit generating an event on condition that the communication unit having connected with the network; and a data acquiring unit acquiring the other data from the location according to the link information stored in the designated information storage unit when the event generating unit generates the event.

27. A device according to claim 23, further comprising:

an event detecting unit detecting an event; and a data acquiring unit acquiring the other data from the location according to the link information stored in the designated information storage unit when the event detecting unit detects the event.

28. The device according to claim 23, wherein the link is a hypertext link.

29. A device for displaying hypertext data including link information indicating an existence of a link to other data, comprising:

a specific information storage unit storing first specific link information and second specific link information;

a designating unit designating informing data corresponding to the link information for the other data to be acquired from among informing data, comprising text and an icon, showing the presence of link information in the hypertext data displayed on a display;

a selecting unit selecting either the first specific link information or the second specific link information stored in the specific information storage unit;

a judging unit judging whether the link information designated by the designating unit agree with the specific link information selected by the selecting unit; and a controlling unit acquiring the other data according to the designated link information when it is judged that the designated link information agree with the selected specific link information, and storing the designated link information in a designated information storage unit when it is judged that the designated link information do not agree with the selected specific link information, wherein the specific link information is acquired relating to the designated informing data when the designated informing data is displayed in an off-line state such that the designated informing data can be subsequently read in an on-line state.

30. A device according to claim 29, further comprising:

a data storing unit storing the other data, wherein the first specific link information is link information indicating an existence of a link to the other data stored in the data storing unit and the second specific link information is link information indicating an existence of a link to the other data present on a network.

31. A device according to claim 29, further comprising:

a communication unit to connect with a network;

an event generating unit generating an event on condition that the communication unit having connected with the network; and a data acquiring unit acquiring the other data from the location according to the link information stored in the designated information storage unit when the event generating unit generates the event.

32. A device according to claim 29, further comprising:

an event detecting unit detecting an event; and a data acquiring unit acquiring the other data from the location according to the link information stored in the designated information storage unit when the event detecting unit detects the event.

33. The device according to claim 29 wherein the link is a hypertext link.

34. A method for displaying hypertext data including link information indicating an existence of a link to appointed information, comprising:

designating informing data corresponding to the link information for the other data to be acquired from among informing data, comprising text and an icon, showing the presence of link information in the hypertext data displayed on a display;

judging whether the other data should be acquired based on the link information designated by the designating; and acquiring the other data according to the designated link information when it is judged that the other data should be acquired, and storing the designated link information in designated information storage when it is judged that the other data should not be acquired, wherein the link information is acquired relating to the designated informing data when the designated informing data is displayed in an off-line state such that the designated informing data can be subsequently read in an on-line state.

35. The method according to claim 34, further comprising:

storing specific link information, wherein the judging judges that the other data should be acquired when the designated link information agree with the specific link information stored, and judges that the other data should not be acquired when the designated link information do not agree with the specific link information.

36. The method according to claim 35, further comprising:

storing the other data, wherein the specific link information stored is link information indicating an existence of a link to the other data stored.

37. The method according to claim 34, further comprising:

connecting with a network;

generating an event on condition of having connected with the network; and acquiring the other data from the location according to the link information stored when the generating generates the event.

38. The method according to claim 34, further comprising:

detecting an event; and acquiring the other data from the location according to the link information stored when the detecting detects the event.

39. The method according to claim 34, wherein the link is a hypertext link.

40. A storage medium for a computer on which a program for displaying hypertext data including link information from the hypertext data to other data, said program when executed by the computer causes the computer to execute the functions comprising:

designating informing data corresponding to the link information for the other data to be acquired from among informing data, comprising text and an icon, showing the presence of link information in the hypertext data displayed on a display;

judging whether the other data should be acquired based on the link information designated by the designating; and acquiring the other data according to the designated link information when it is judged that the other data should be acquired, and storing the designated link information in designated information storage when it is judged that the other data should not be acquired, wherein the link information is acquired relating to the designated informing data when the designated informing data is displayed in an off-line state such that the designated informing data can be subsequently read in an on-line state.

41. The medium according to claim 40, further comprising:
   storing specific link information,
   wherein the judging judges that the other data should be acquired when the designated link information agree with the specific link information stored, and judges that the other data should not be acquired when the designated link information do not agree with the specific link information.

42. The medium according to claim 41, further comprising:
   storing the other data,
   wherein the specific link information stored is link information indicating an existence of a link to the other data stored.

43. The medium according to claim 40, further comprising:
   connecting with a network;
   generating an event on condition of having connected with the network; and
   acquiring the other data from the location according to the link information stored when the generating generates the event.

44. The medium according to claim 40, further comprising:
   detecting an event; and
   acquiring the other data from the location according to the link information stored when the detecting detects the event.

45. The medium according to claim 40, wherein the link is a hypertext link.

46. A method of displaying hypertext data including link information indicating an existence of a link to other data, the method comprising:
   designating by a first information processing device informing data corresponding to the link information for the other data to be acquired from among informing data, comprising text and an icon, showing the presence of link information in hypertext data displayed on a display;
   acquiring by the first information processing device information showing a location of the displayed hypertext data including the informing data designated by the designating;
   acquiring by the first information processing device the link information specified by the informing data designated by the designating;
   transmitting by the first information processing device the location information acquired and the link information of the hypertext data acquired;
   receiving by a second information processing device the location information and the link information of the hypertext data which have been transmitted; and
   acquiring by the second information processing device the hypertext data from the location according to the received the location information and the other data indicated by the link information according to the received link information,
   wherein the acquiring by the first and second information processing devices relates to acquiring respective location and link information related to the designated informing data when the designated informing data is displayed in an off-line state such that the designated informing data can be subsequently read in an on-line state.

47. The method according to claim 46, further comprising:
   storing by the first information processing device the location information acquired and the link information acquired for the correspondence to each other,
   wherein the transmitting transmits the location information and the link information of the hypertext data both stored to the second information processing device.

48. The method according to claim 46, further comprising:
   storing by the second information processing device the location information and the link information both received for the correspondence to each other,
   wherein the acquiring acquires the hypertext data from the location according to the location information and the other data indicated by the link information.

49. The method according to claim 46, wherein the link is a hypertext link.

50. A method of displaying hypertext data including link information indicating an existence of a link to other data, comprising:
   storing first specific link information and second specific link information;
   designating informing data corresponding to the link information for the other data to be acquired from among informing data, comprising text and an icon, showing the presence of link information in the hypertext data displayed on a display;
   selecting either the first specific link information or the second specific information stored;
   judging whether the link information designated agree with the specific link information selected; and
   acquiring the other data according to the designated link information when it is judged that the designated link information agree with the selected specific link information, and storing the designated link information when it is judged that the designated link information do not agree with the selected specific link information,
   wherein the link information is acquired relating to the designated informing data when the designated informing data is displayed in an off-line state such that the designated informing data can be subsequently read in an on-line state.

51. The method according to claim 50, further comprising:
   storing the other data,
   wherein the first specific link information is link information indicating an existence of a link to the other data stored and the second specific link information is link information indicating an existence of a link to the other data present on a network.

52. The method according to claim 50, further comprising:
   connecting with a network;
   generating an event on condition of having connected with the network; and
   acquiring the other data from the location according to the link information stored when the generating generates the event.

53. The method according to claim 50, further comprising:
   detecting an event; and
   acquiring the other data from the location according to the link information stored when the detecting detects the event.

54. The method according to claim 50, wherein the link is a hypertext link.

55. A computer-readable medium storing a program displaying hypertext data including link information indicating an existence of a link to other data, the program when executed by a computer causes the computer to execute the functions comprising:

designating by a first information processing device informing data corresponding to the link information for the other data to be acquired from among informing data, comprising text and an icon, showing the presence of link information in hypertext data displayed on a display;

acquiring by the first information processing device information showing a location of the displayed hypertext data including the informing data designated by the designating;

acquiring by the first information processing device the link information specified by the informing data designated by the designating;

transmitting by the first information processing device the location information acquired and the link information of the hypertext data acquired;

receiving by a second information processing device the location information and the link information of the hypertext data which have been transmitted; and acquiring by the second information processing device the hypertext data from the location according to the received the location information and the other data indicated by the link information according to the received link information, wherein the acquiring by the first and second information processing devices relates to acquiring respective location and link information related to the designated informing data when the designated informing data is displayed in an off-line state such that the designated informing data can be subsequently read in an on-line state.

56. The medium according to claim 55, further comprising:

storing by the first information processing device the location information acquired and the link information acquired for the correspondence to each other, wherein the transmitting transmits the location information and the link information of the hypertext data both stored to the second information processing device.

57. The medium according to claim 55, further comprising:

storing by the second information processing device the location information and the link information both received for the correspondence to each other, wherein the acquiring acquires the hypertext data from the location according to the location information and the other data indicated by the link information.

58. The medium according to claim 55, wherein the link is a hypertext link.

59. A computer-readable medium storing a program displaying hypertext data including link information indicating an existence of a link to other data, said program when executed by a computer causes the computer to execute the functions comprising:

storing first specific link information and second specific link information;

designating informing data, comprising text and an icon, corresponding to the link information for the other data to be acquired from among informing data showing the presence of link information in the hypertext data displayed on a display;

selecting either the first specific link information or the second specific information stored;

judging whether the link information designated agree with the specific link information selected; and acquiring the other data according to the designated link information when it is judged that the designated link information agree with the selected specific link information, and storing the designated link information when it is judged that the designated link information do not agree with the selected specific link information, wherein the link information is acquired relating to the designated informing data when the designated informing data is displayed in an off-line state such that the designated informing data can be subsequently read in an on-line state.

60. The medium according to claim 59, further comprising:

storing the other data, wherein the first specific link information is link information indicating an existence of a link to the other data stored and the second specific link information is link information indicating an existence of a link to the other data present on a network.

61. The medium according to claim 59, further comprising:

connecting with a network;

generating an event on condition of having connected with the network; and acquiring the other data from the location according to the link information stored when the generating generates the event.

62. The medium according to claim 59, further comprising:

detecting an event; and acquiring the other data from the location according to the link information stored when the detecting detects the event.

63. The medium according to claim 59, wherein the link is a hypertext link.

* * * * *

UNITED STATES PATENT AND TRADEMARK OFFICE
CERTIFICATE OF CORRECTION

PATENT NO. : 6,931,588 B1 Page 1 of 1
APPLICATION NO. : 09/288294
DATED : August 16, 2005
INVENTOR(S) : Ichiro Nakano It is certified that error appears in the above-identified patent and that said Letters Patent is hereby corrected as shown below:

Column 18, Line 67 - Column 19, Line 1, change
"infor
mation" to
--infor-
mation--.

Signed and Sealed this

Seventh Day of August, 2007

JON W. DUDAS
*Director of the United States Patent and Trademark Office*